Feb. 2, 1932.   P. MacGAHAN   1,843,572
METHOD OF MAKING CHART RECORDS
Filed Nov. 13, 1929

INVENTOR
*Paul MacGahan.*
BY
ATTORNEY

Patented Feb. 2, 1932

1,843,572

UNITED STATES PATENT OFFICE

PAUL MacGAHAN, OF ORANGE, NEW JERSEY, ASSIGNOR TO WESTINGHOUSE ELECTRIC & MANUFACTURING COMPANY, A CORPORATION OF PENNSYLVANIA

METHOD OF MAKING CHART RECORDS

Application filed November 13, 1929. Serial No. 406,837.

My invention relates to methods of making chart records and particularly to methods for improving the records of delicate instruments.

One object of my invention is to provide a method of making chart records that shall permit the use, as a recorder, of an instrumentality heretofore not considered feasible or practicable for such purpose.

Another object of my invention is to provide a method whereby a chart may be inscribed by a marker or recorder, and the chart subsequently treated to bring out a record trace thereon.

Further objects, such as the reduction in the cost of manufacture of the instruments, the elimination of the disadvantages attending the use of ink and the ability to inscribe records over long periods of time without attention to the recording elements are also contemplated.

In graphic recording instruments, in which the mechanisms for relatively moving the charts and markers are delicate or are impelled by only a slight torque, it has been customary to employ inking pens and paper charts. Such devices have certain well-known disadvantages, such as blotting and evaporation of the ink, requiring undue attention, requiring niceties of construction and operation and causing friction.

To obviate the above-mentioned features, it has been suggested to employ electric-spark markers, smoke charts, chemically-treated charts, light-sensitive paper and other expedients of sundry complicated and expensive types.

The ordinary lead or graphite pencils have not been adapted for delicate graphic meters because of the light torque available to bias the pencil into engagement with the chart, and the consequent impossibility of making a suitably legible record.

It is an object of my invention to overcome all of the above-mentioned objections, and, in practicing the method of my invention, I employ a marker that applies soluble dry particles to the chart and a quickly-drying solvent that is sprayed on the particles to momentarily dissolve them. The particles are preferably of such character that, when dissolved on the chart, they dye the chart and spread through its fibers. A quick-drying readily-vaporized solvent, such as alcohol, is employed so that the particles will not disappear in solution. The mark, constituted by the particles, will thus be retained within its original outline and made more readily visible.

Figure 1:
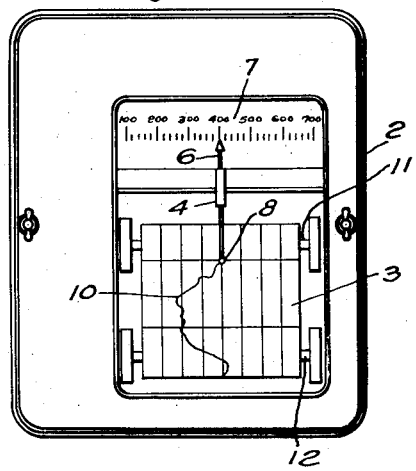
Figure 2:
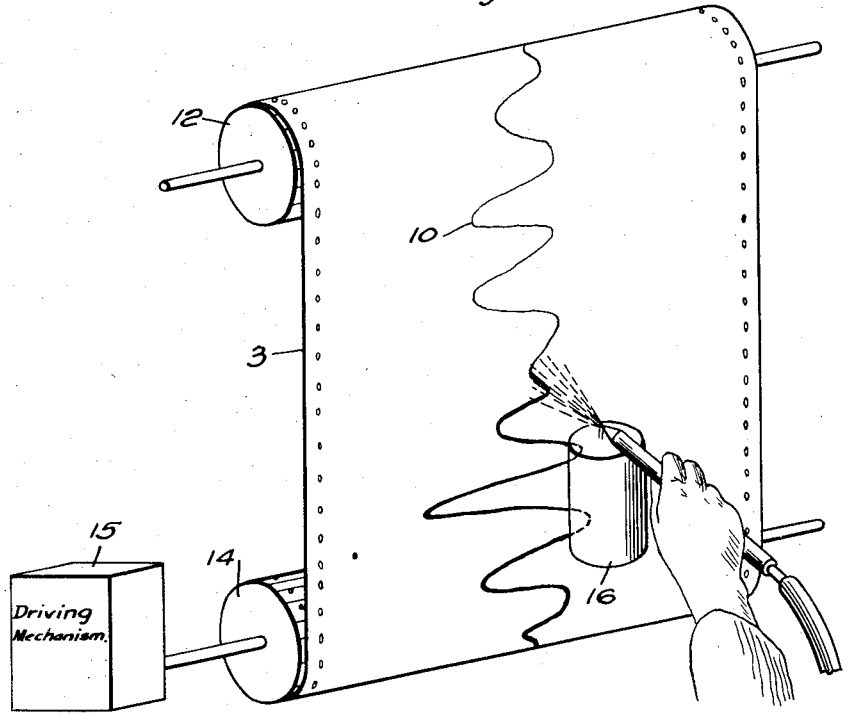

Figure 1, of the accompanying drawings, is a front elevational view of a graphic recording meter, in connection with which the method of my invention is adapted to function, and Fig. 2 is a perspective view of auxiliary devices employed in practicing my method.

The device of Fig. 1 is merely illustrative of a recording instrument of the type to which my improved method is applicable. Although my invention is applicable to recording instruments of all types, the construction here disclosed comprises, in general, a casing 2, a movable record chart 3 and a movable recording element 4. The casing 2, being representative of any suitable meter, encloses a mechanism (not shown) for moving the chart 3 and the element 4, relatively, in accordance with time, or other quantity, and the amplitude of a quantity to be measured.

The chart 3 is preferably of white paper and may be of the form illustrated in Fig. 2, and be transferrable from one roll to another during the recording operation; or it may be of circular-disk form or of any other suitable character.

The movable element 4 may include a pointer 6 for cooperation with a scale 7 but essentially carries a recording member or marker 8 for effecting one step of my improved method. The marker 8, in one form suitable to the steps of the method, may preferably comprise a pencil that is strong in aniline dye whereby a trace 10 may be made on the chart 3.

For purposes of illustration, in Fig. 1, this trace is shown to be of exaggerated legibility, since the pencil or marker 8 is very delicately suspended, bears against the chart with substantially minimum friction and is actually of a character not capable of making a sufficiently legible mark under these conditions.

After the chart has been completely unwound from a supply roll 11 and wound upon a take-up roll 12, as illustrated in Fig. 1, during which operation the record trace has been made along substantially the entire length of the chart, the take-up roll may be removed from the meter and placed in the auxiliary device of Fig. 2 in which it is placed in a position in which it operates as a supply roll for a take-up roll 14. A driving mechanism 15, of any suitable character, may be provided for transferring the chart from the roll 12 to the roll 14, during which operation the trace 10 is sprayed, through the medium of a device 16.

The spraying agent is preferably of volatile-liquid form, depending on the character of the pencil 8. When this pencil is of a material strong in analine dye, as above mentioned, water may be employed or, preferably, alcohol or other volatile solvent, which is projected from the device 16 under pressure and in the form of spray or comminuted particles. Analine dye is readily soluble in alcohol or other solvent, which evaporate quickly leaving a clear record.

As illustrated in Fig. 2, the trace 10 above the spray is of weak legibility, while, below the spray, the trace has been rendered quite strongly legible by the application of the spray, and is permanently "fixed" on the chart. The figure illustrates the step of progressively spraying the rather weak trace, as originally made in the meter, to render it of strong visibility.

For a chart of circular-disk form, the spraying is, of course, a comparatively simple operation, since the entire record surface may be exposed in a small area at one time.

My invention, although simple, permits the use of a pencil comparable to an ordinary graphite pencil in an art to which it has not heretofore been adapted, eliminates the disadvantages of ink, electric-spark and other devices, permits the meter to be of simple, compact, durable, accurate and effective in character and not requiring frequent attention and is an improvement, in general, in the art to which it relates.

While I have shown and described a particular form of my invention, changes may be effected therein without departing from the spirit and scope thereof, as set forth in the appended claims.

I claim as my invention:

1. The method of making a chart record which comprises automatically making a record mark of soluble material on a chart in response to variations in a quantity and spraying the mark with a liquid solvent.

2. The method of making a chart record which comprises automatically making a mark of soluble material on a chart in response to variations in a quantity and applying alcohol to the chart to momentarily dissolve said material.

3. The method of making a chart record which comprises automatically applying a soluble substance in the form of solid particles to the chart in response to variations in a quantity and depositing a quickly-evaporating solvent on the particles to only partially dissolve the same, whereby they dye the chart within close outlines of a record mark represented by the particles which is thereby made more strongly visible and is prevented from disappearing in solution.

4. The method of making a chart record which comprises automatically making a mark upon a chart in response to variations in a quantity by a body including an aniline dye and spraying the mark with alcohol.

In testimony whereof I have hereunto subscribed my name this eighth day of Nov., 1929.

PAUL MacGAHAN.